(12) United States Patent
Nakano (10) Patent No.: US 10,066,584 B2
(45) Date of Patent: Sep. 4, 2018

(54) ERROR DETERMINATION UNIT (71) Applicant: HINO MOTORS, LTD., Hino-shi, Tokyo (JP)

(72) Inventor: Hitoshi Nakano, Hino (JP)

(73) Assignee: HINO MOTORS, LTD., Hino-Shi, Tokyo (JP)

( * ) Notice: Subject to any disclaimer, the term of this patent is extended or adjusted under 35 U.S.C. 154(b) by 0 days.

(21) Appl. No.: 15/318,317

(22) PCT Filed: Jul. 31, 2015

(86) PCT No.: PCT/JP2015/071763
§ 371 (c)(1),
(2) Date: Dec. 12, 2016

(87) PCT Pub. No.: WO2016/021488
PCT Pub. Date: Feb. 11, 2016

(65) Prior Publication Data
US 2017/0241378 A1 Aug. 24, 2017

(30) Foreign Application Priority Data
Aug. 8, 2014 (JP) .................. 2014-162724

(51) Int. Cl.
*F02M 26/49* (2016.01)
*F02M 26/47* (2016.01)

(52) U.S. Cl.
CPC ............ *F02M 26/49* (2016.02); *F02M 26/47* (2016.02)

(58) Field of Classification Search
CPC ........ F02M 26/49; F02M 26/47; Y02T 10/47; F02D 41/0072; F02D 2041/007; F02D 41/0077; F02D 41/22; F02D 41/221
See application file for complete search history.

(56) References Cited

U.S. PATENT DOCUMENTS 4,723,528 A   2/1988 Tamura
5,943,999 A * 8/1999 Yoshihara ........... F02D 41/0055
                                             123/568.16
(Continued)

FOREIGN PATENT DOCUMENTS

EP   2543845 A1   1/2013
JP   S62203969 A  9/1987
(Continued)

OTHER PUBLICATIONS

English translation of the International Preliminary Report on Patentability corresponding to PCT/JP2015/071763, dated Feb. 14, 2017.

(Continued)

*Primary Examiner* — Freddie Kirkland, III
(74) *Attorney, Agent, or Firm* — Kilpatrick Townsend & Stockton (57) ABSTRACT

An anomaly determination unit includes an EGR amount acquisition section configured to acquire an actual amount of an EGR amount, which is a flow rate of EGR gas; an estimation amount computation section configured to compute an estimated amount of the EGR amount based on a working gas pressure, which is a pressure of working gas in which the EGR gas and intake air are mixed, an EGR temperature, which is a temperature of the EGR gas immediately upstream of an EGR valve, an EGR pressure, which is a pressure of the EGR gas immediately upstream of the EGR valve, and an opening degree instruction value for the EGR valve; and a determination section configured to determine the presence or absence of an anomaly in the EGR valve based on the divergence between the actual amount of the EGR amount and the estimated amount.

5 Claims, 4 Drawing Sheets

(56) References Cited

U.S. PATENT DOCUMENTS

| | | | |
|---|---|---|---|
| 5,964,820 A | 10/1999 | Miwa et al. | |
| 6,802,302 B1 | 10/2004 | Li et al. | |
| 7,290,528 B2 * | 11/2007 | Minegishi | F02D 41/0072 |
| | | | 123/399 |
| 9,389,144 B2 * | 7/2016 | Han | G01M 15/102 |
| 2007/0119434 A1 | 5/2007 | Minegishi et al. | |
| 2014/0372010 A1 * | 12/2014 | Han | G01M 15/102 |
| | | | 701/108 |

FOREIGN PATENT DOCUMENTS

| | | |
|---|---|---|
| JP | 4228953 B2 | 8/1992 |
| JP | 2002332879 A | 11/2002 |
| WO | WO2005/040592 A1 | 5/2005 |

OTHER PUBLICATIONS

Search Report dated Nov. 24, 2017 corresponding to European Application No. 15829876.
Search Report dated Oct. 20, 2015 corresponding to PCT/JP2015/071763, dated Jul. 31, 2015.

* cited by examiner

ERROR DETERMINATION UNIT

TECHNICAL FIELD

The present invention relates to an anomaly determination unit that determines the presence or absence of an anomaly in an EGR valve.

BACKGROUND ART

Conventionally, diesel engines include exhaust gas recirculation (EGR) devices that introduce some exhaust gas to intake passages to reduce NOx contained in the exhaust gas (e.g., refer to Patent Document 1). An EGR device includes an EGR valve in an EGR passage that connects an exhaust passage to an intake passage and adjusts the amount of EGR gas introduced to the intake passage by controlling the opening degree of the EGR valve.

In recent years, various types of techniques have been proposed that determine the presence or absence of anomalies in an EGR valves using an on-board diagnostic system (OBD), which is installed in a vehicle. As an example of anomaly determination techniques, a technique is known that determines the presence or absence of an anomaly in an EGR valve with respect to responsiveness, which is a change in the EGR valve relative to a change in an opening degree instruction value to the EGR valve. The presence or absence of an anomaly of responsiveness can be determined by measuring the EGR amount when the EGR valve is opened and closed in a no-load state, in which the pressure of the intake passage and the pressure of the exhaust passage are stable.

PRIOR ART DOCUMENT

Patent Document

Patent Document 1: Japanese Laid-Open Patent Publication No. 2002-332879

SUMMARY OF THE INVENTION

Problem that the Invention is to Solve

However, with the aforementioned method, the presence or absence of an anomaly in the EGR valve cannot be determined, e.g., during operation of the exhaust brake, in which the EGR valve is maintained in a completely closed state, even if the engine is in the no-load state. Thus, in the anomaly determination unit, a technique is desired that can determine the presence or absence of an anomaly in the EGR valve even when the opening degree of the EGR valve is limited.

It is an objective of the present invention to provide an anomaly determination unit capable of determining the presence or absence of an anomaly in an EGR valve even in an operation state in which the opening degree of the EGR valve is limited.

Means for Solving the Problems

According to one aspect of the present invention, an anomaly determination unit includes an EGR amount acquisition section configured to acquire an actual amount of an EGR amount, which is a flow rate of EGR gas, an estimation amount computation section configured to compute an estimated amount of the EGR amount based on a working gas pressure, which is a pressure of working gas in which the EGR gas and intake air are mixed, an EGR temperature, which is a temperature of the EGR gas immediately upstream of an EGR valve, an EGR pressure, which is a pressure of the EGR gas immediately upstream of the EGR valve, and an opening degree instruction value for the EGR valve, and a determination section configured to determine the presence or absence of an anomaly in the EGR valve based on divergence between the actual amount of the EGR amount and the estimated amount.

MODES FOR CARRYING OUT THE INVENTION

Figure 1:
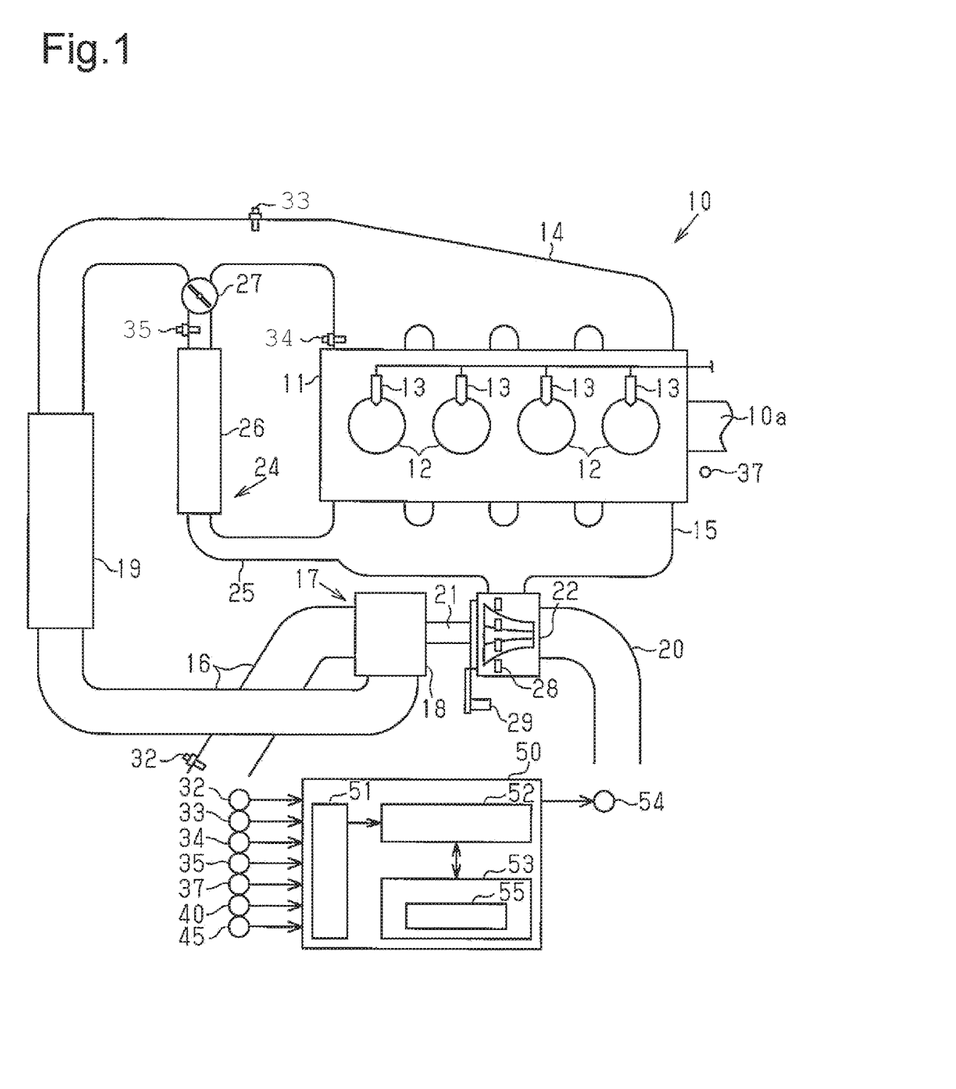
FIG. 1 is a schematic diagram of a diesel engine in which an anomaly determination unit according to one embodiment is installed.

With reference to FIGS. 1 to 4, an anomaly determination unit according to one embodiment will now be described. With reference to FIG. 1, the whole structure of a diesel engine in which the anomaly determination unit is installed will now be described.

As shown in FIG. 1, a diesel engine 10 (hereinafter, referred to simply as the engine 10) includes four cylinders 12 in a cylinder block 11. The engine 10 includes injectors 13, each of which is provided for a cylinder 12 and injects fuel to the cylinder 12. An intake manifold 14 for supplying working gas to each cylinder 12 and an exhaust manifold 15, into which exhaust gas from each cylinder 12 flows, are connected to the cylinder block 11.

An air cleaner (not shown), a compressor 18, which is a component of a turbocharger 17, and an inter cooler 19 are coupled, in this order from the upstream side, to an intake passage 16, which is connected to the intake manifold 14. A turbine 22, which is coupled to the compressor 18 via a coupling shaft 21, is arranged on an exhaust passage 20, which is connected to the exhaust manifold 15. An EGR passage 25 of an EGR device 24 is connected to the exhaust manifold 15. The EGR passage 25 is connected to the intake passage 16 and introduces some of the exhaust gas to the intake passage 16.

The EGR device 24 includes an EGR cooler 26, which is arranged on the EGR passage 25, and an EGR valve 27, which is arranged downstream of the EGR cooler 26. The EGR valve 27 is capable of changing the flow path cross-sectional area of the EGR passage 25. An EGR valve control device 40 controls the opening degree of the EGR valve 27 according to the operation state of the engine 10. Working gas, which is a mixture of exhaust gas and intake air, is supplied to the cylinders 12 when the EGR valve 27 is in an open state. The exhaust gas within the EGR passage 25 is EGR gas.

The turbocharger 17 is a variable nozzle turbocharger (VNT) with a variable nozzle 28 arranged in the turbine 22.

The opening degree of the variable nozzle 28 is changed by driving an actuator 29 with a stepping motor.

The engine 10 includes an intake air amount sensor 32, a working gas pressure sensor 33, a working gas temperature sensor 34, an EGR temperature sensor 35, and an engine speed sensor 37. The intake air amount sensor 32 detects an intake air amount Ga, which is a mass flow rate of intake air flowing through the intake passage 16, in the intake passage 16 upstream of the compressor 18. The working gas pressure sensor 33 detects a working gas pressure Pwg, which is the pressure of working gas flowing in the intake passage 16, downstream of the connection portion between the intake passage 16 and the EGR passage 25. The working gas temperature sensor 34 detects a working gas temperature Twg, which is the temperature of working gas within the intake manifold 14. The EGR temperature sensor 35 detects an EGR temperature Tr, which is the temperature of the EGR gas in the EGR passage 25 downstream of the EGR cooler 26 and immediately upstream of the EGR valve 27. The engine speed sensor 37 detects an engine speed Ne, which is the number of revolutions of a crankshaft 10a. Each of the sensors 32, 33, 34, and 37 outputs a signal indicating the detected value of the sensor to the anomaly determination unit 50.

In addition to signals from the sensors 32, 33, 34, 37, the anomaly determination unit 50 receives a signal indicating an opening degree instruction value θrc for the EGR valve 27 from an EGR valve control device 40 that controls the opening degree of the EGR valve 27 and a signal indicating a nozzle opening degree θtc, which is an opening degree instruction value for the variable nozzle 28 from the VNT control device 45 that controls the opening degree of the variable nozzle 28. The opening degree instruction value θrc and the nozzle opening degree θtc have values between 0 and 1. In the range, 0 indicates a full open state, and 1 indicates a completely closed state. The greater the value, the smaller the opening area is.

The anomaly determination unit 50 is mainly configured by a microcomputer having a CPU, a ROM, and a RAM. The anomaly determination unit 50 includes an acquisition section 51, which acquires various types of information based on signals received by the anomaly determination unit 50, a processing section (or processing circuitry) 52, which executes various types of processing, and a memory section 53, which stores various types of control programs and various types of data. The processing section 52 executes a determination process that determines the presence or absence of an anomaly in the EGR valve 27 based on various types of information acquired by the acquisition section 51, based on the various types of control programs stored in the memory section 53. When it is determined that an anomaly is present in the EGR valve 27, the anomaly determination unit 50 stores data indicating the type of the anomaly in a predetermined area of the memory section 53 and notifies a driver of the presence of an anomaly in the EGR valve 27 by lighting an alarm lamp 54.

Figure 2:
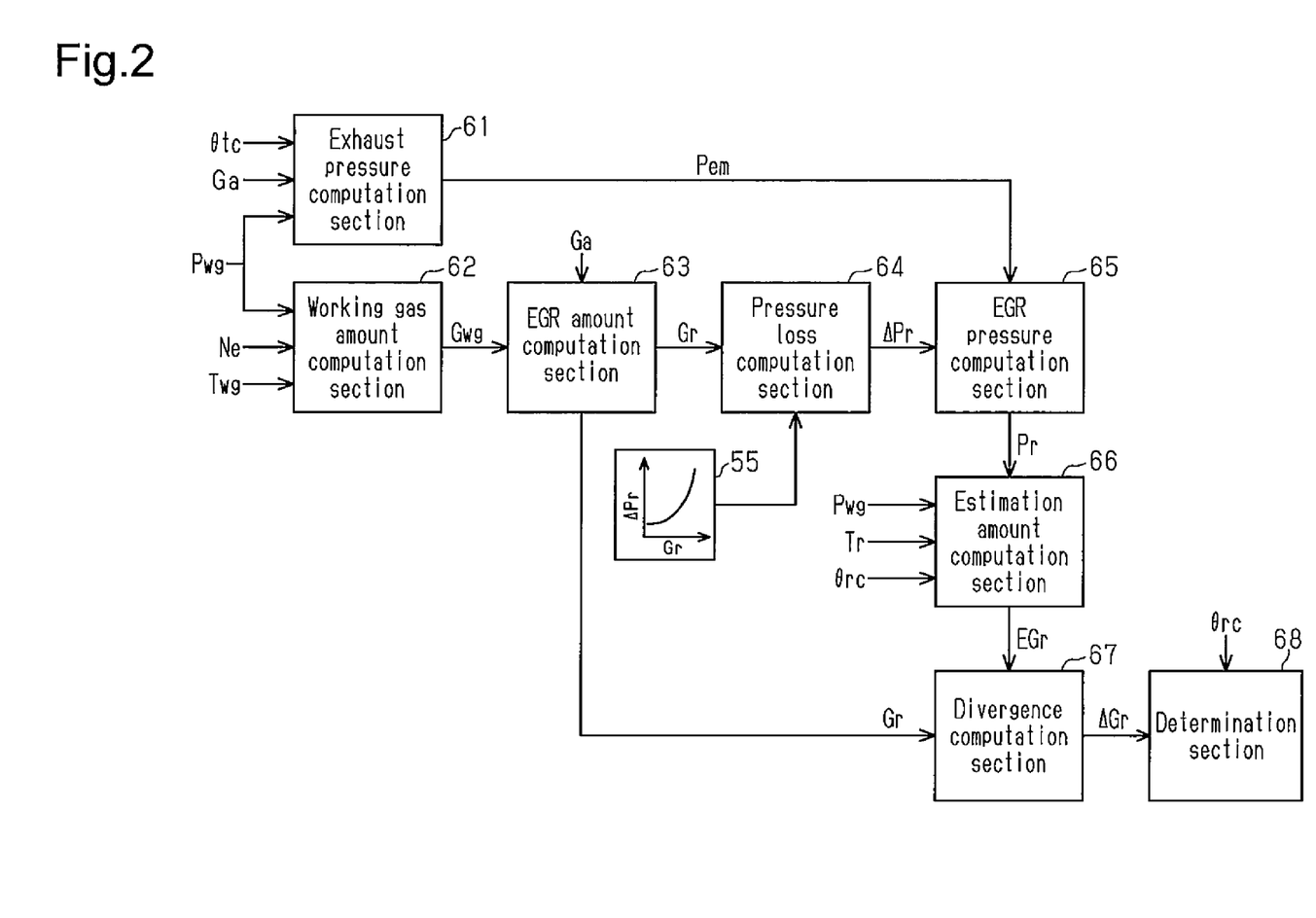
FIG. 2 is a diagram illustrating computational blocks in a processing section of the anomaly determination unit of FIG. 1.

As shown in FIG. 2, the processing section 52 includes an exhaust pressure computation section 61, a working gas amount computation section 62, an EGR amount computation section 63, a pressure loss computation section 64, an EGR pressure computation section 65, an estimation amount computation section 66, a divergence computation section 67, and a determination section 68.

The exhaust pressure computation section 61 computes an exhaust pressure Pem, which is the pressure of exhaust gas within the exhaust manifold 15. The exhaust pressure computation section 61 computes the exhaust pressure Pem by substituting the working gas pressure Pwg, the intake air amount Ga, and the nozzle opening degree θtc into an experimental equation that is represented by equation (1). In the experimental equation, "n" has values selected for individual variable nozzle turbochargers. The smaller the value selected for the variable nozzle turbocharger, the more linearly the opening area changes relative to a change in the nozzle opening degree.

$$P_{em} = P_{wg} \times f(G_a/(1-\theta tc)^n) \, n=1,2,3 \qquad \text{Equation (1)}$$

The working gas amount computation section 62 computes the working gas amount Gwg, which is a mass flow rate of working gas supplied to the cylinders 12. The working gas amount computation section 62 computes the working gas amount Gwg by substituting, in an equation of state, $P \times V = Gwg \times R \times T$, the working gas pressure Pwg for P, substituting, for V, a value that is based on a value obtained by multiplying the engine speed Ne by the exhaust amount D of the engine 10, substituting the gas constant for R, and substituting the working gas temperature Twg for T.

The EGR amount computation section 63 is an EGR amount acquisition section that acquires the actual EGR amount and computes an EGR amount Gr, which is the mass flow rate of the EGR gas flowing back to the intake passage 16, as the actual EGR amount. The EGR amount computation section 63 computes the EGR amount Gr by subtracting the intake air amount Ga from the working gas amount Gwg, which is a computed result of the working gas amount computation section 62.

The pressure loss computation section 64 computes the pressure loss ΔPr of the EGR gas in the EGR passage 25. The pressure loss computation section 64 computes the pressure loss ΔPr based on the EGR amount Gr, which is a computed result of the EGR amount computation section 63, and a pressure loss map 55, which is stored in the memory section 53. The pressure loss map 55 has data in which the pressure loss ΔPr of the EGR gas before reaching the EGR valve 27 is defined in accordance with EGR amount Gr. The pressure loss computation section 64 computes the pressure loss ΔPr by selecting the pressure loss ΔPr corresponding to the EGR amount Gr from the pressure loss map 55.

The EGR pressure computation section 65 computes the EGR pressure Pr, which is the pressure of the EGR gas immediately upstream of the EGR valve 27. The EGR pressure computation section 65 computes the EGR pressure Pr by subtracting the pressure loss ΔPr from the exhaust pressure Pem.

The estimation amount computation section 66 computes an estimated amount EGr of the EGR amount Gr. The estimation amount computation section 66 computes the estimated amount EGr of the EGR amount Gr by substituting individual values into the estimation amount computation equation based on Bernoulli's principle, which is represented by equation (2). Ar is the opening area of the EGR valve 27 corresponding to the opening degree instruction value θrc, and κ is the ratio of specific heat of exhaust gas.

$$EGr = Ar \cdot \sqrt{\frac{2 \cdot \kappa \cdot Pr^2}{(\kappa-1) \cdot R \cdot Tr} \left[ \left(\frac{Pwg}{Pr}\right)^{\frac{2}{\kappa}} - \left(\frac{Pwg}{Pr}\right)^{\frac{\kappa+1}{\kappa}} \right]} \qquad \text{Equation (2)}$$

The divergence computation section 67 computes the divergence ΔGr by subtracting the estimated amount EGr, which is a computed result of the estimation amount computation section 66, from the EGR amount Gr, which is a computed result of the EGR amount computation section 63. The divergence $\Delta Gr$ has a positive value when the EGR amount Gr is greater than the estimated amount EGr. The divergence $\Delta Gr$ has a negative value when the EGR amount Gr is less than the estimated amount EGr.

The determination section 68 determines the presence or absence of an anomaly in the EGR valve 27 according to change in the opening degree instruction value $\theta rc$ based on the opening degree instruction value $\theta rc$ and the divergence $\Delta Gr$.

The determination section 68 determines that the opening degree of the EGR valve 27 is in a steady state when the absolute value of the derivative value $\Delta\theta rc$ of the opening degree instruction value $\theta rc$ is equal to or less than a first threshold $\Delta\theta rc1$, with which it is determined that the opening degree of the EGR valve 27 is constant. The determination section 68 determines the presence or absence of two anomalies, high flow in which the EGR amount Gr is excessively large relative to the opening degree instruction value $\theta rc$ and low flow in which the EGR amount Gr is excessively small relative to the opening degree instruction value $\theta rc$, when the steady state continues for a predetermined first determination period. Here, the integrated value of the divergence $\Delta Gr$ for the first determination period is defined as a first determination value $\Delta Grj1$. The determination section 68 determines that low flow is present in the EGR valve 27 when the first determination value $\Delta Grj1$ is less than a lower limit value $\Delta Grmin$, which is a negative value. The determination section 68 determines that high flow is present in the EGR valve 27 when the first determination value $\Delta Grj1$ is greater than an upper limit value $\Delta Grmax$, which is a positive value. The duration period of the steady state can be counted, e.g., with a timer, a counter, or the like, which is reset when the state of the EGR valve 27 is switched to the steady state.

The determination section 68 determines that the opening degree of the EGR valve 27 is in a rapid change state when the absolute value of the derivative value $\Delta\theta rc$ of the opening degree instruction value $\theta rc$ is greater than a second threshold $\Delta\theta rc2$ ($\Delta\theta rc2 > \Delta\theta rc1$). When the rapid change state continues for a second determination period, the determination section 68 determines the presence or absence of an anomaly in the EGR valve 27 with respect to the responsiveness. Here, the absolute value of the integrated value of the divergence $\Delta Gr$ for the second determination period is defined as a second determination value $\Delta Grj2$. For example, the second threshold $\Delta\theta rc2$ is a value that allows the EGR valve 27 in the completely closed state to be changed to the full open state within one second. The duration period of the rapid change state can be counted, e.g., with a timer, a counter, or the like, which is reset when the state of the EGR valve 27 is changed to the rapid change state.

The determination section 68 determines that an anomaly is present in the responsiveness of the EGR valve 27 when the second determination value $\Delta Grj2$ is larger than a normal value $\Delta Grnor$. The anomaly of the responsiveness refers, for example, to response delay, or reduction in the speed of the EGR valve 27 due to friction when being opened or closed.

Figure 3:
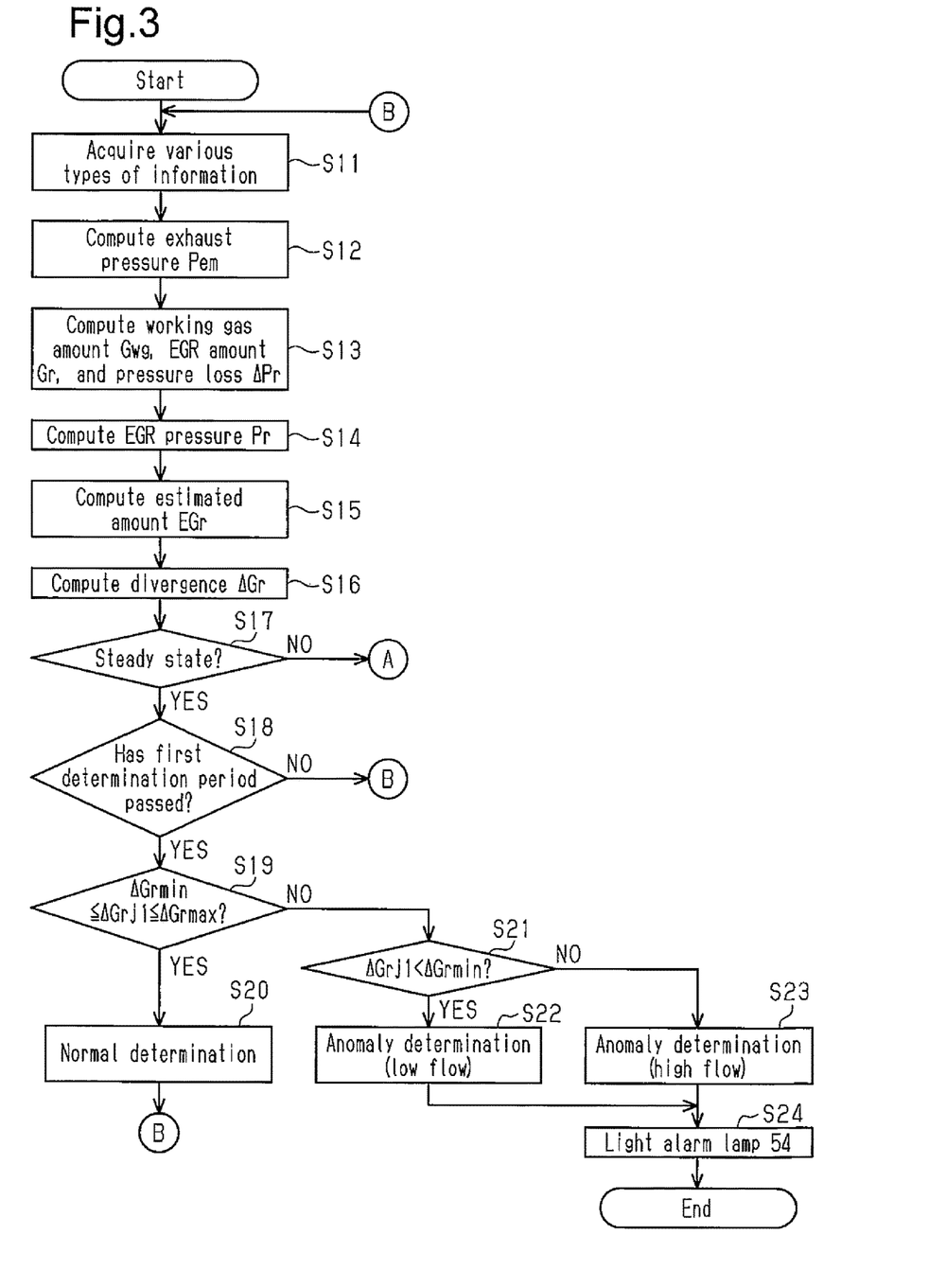
FIG. 3 is a flowchart illustrating one example of a determination process that is executed in the anomaly determination unit of FIG. 1.
Figure 4:
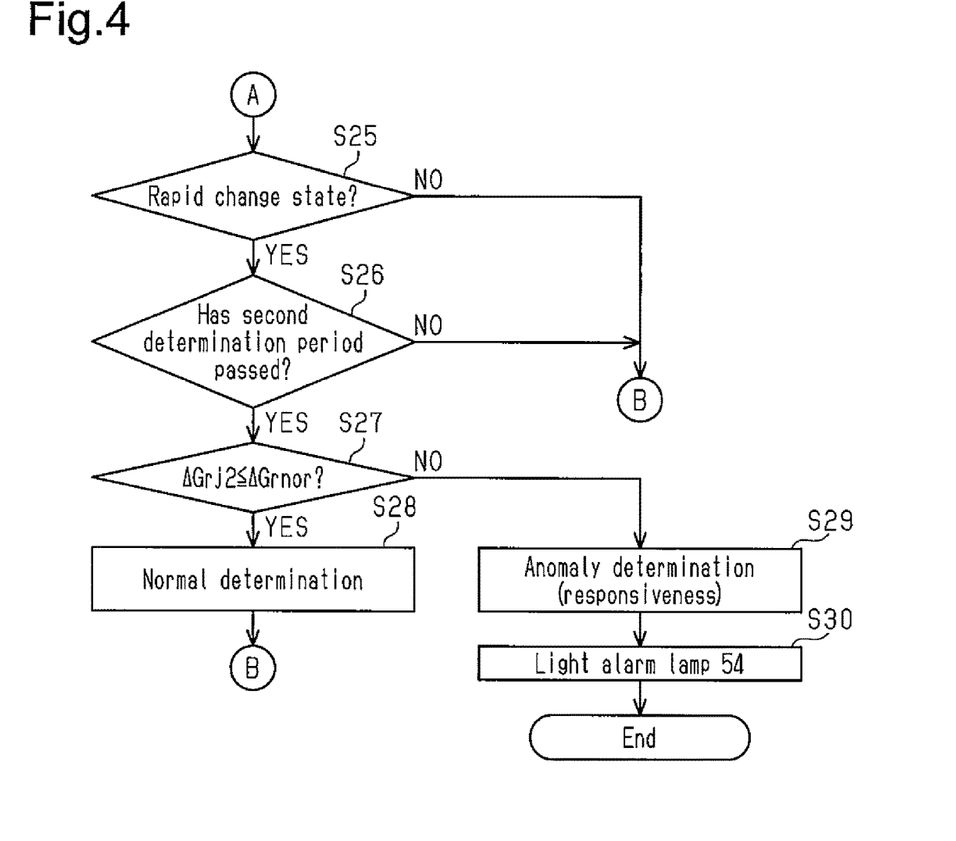
FIG. 4 is a flowchart illustrating one example of a determination process that is executed in the anomaly determination unit of FIG. 1.

With reference to FIGS. 3 and 4, one example of a determination process, which the processing section 52 executes, will now be described. The determination process is started from start of the engine 10.

As shown in FIG. 3, the processing section 52 acquires various types of information through the acquisition section 51 (step S11). In step S12, the processing section 52 computes the exhaust pressure Pem based on the intake air amount Ga, the working gas pressure Pwg, and the nozzle opening degree $\theta tc$.

In the next step S13, the processing section 52 computes the working gas amount Gwg based on the working gas pressure Pwg, the working gas temperature Twg, and the engine speed Ne. In addition, the processing section 52 computes the EGR amount Gr by subtracting the intake air amount Ga acquired in step S11 from the working gas amount Gwg. Further, the processing section 52 computes the pressure loss $\Delta Pr$ of EGR gas based on the EGR amount Gr and the pressure loss map 55, which is stored in the memory section 53. In the next step S14, the processing section 52 computes the EGR pressure Pr by subtracting the pressure loss $\Delta Pr$ from the exhaust pressure Pem.

In the next step S15, the processing section 52 computes the estimated amount EGr based on the EGR temperature Tr, which is acquired in step S11, the EGR pressure Pr, which is computed in step S14, the working gas pressure Pwg, the opening degree instruction value $\theta rc$ for the EGR valve 27, and the estimated amount computational equation represented by the aforementioned equation (2). The processing section 52 then computes the divergence $\Delta Gr$ by subtracting the estimated amount EGr from the EGR amount Gr, which is computed in step S13 (step S16).

The processing section 52 compares the derivative value $\Delta\theta rc$ of the EGR valve 27 with the first threshold $\Delta\theta rc1$ to determine whether the EGR valve 27 is in the steady state (step S17). When the EGR valve 27 is in the steady state (step S17: YES), the processing section 52 determines whether the first determination period has passed from the start of the steady state, i.e., whether the duration period of the steady state exceeds the first determination period (step S18). When the first determination period has not passed (step S18: NO), the processing section 52 moves to the process in step S11. When the first determination period has passed (step S18: YES), the processing section 52 determines whether the first determination value $\Delta Grj1$ is included in a normal range, which is equal to or greater than the lower limit value $\Delta Grmin$ and is equal to or less than the upper limit value $\Delta Grmax$ while the integrated value of the divergence $\Delta Gr$ for the first determination period is defined as the first determination value $\Delta Grj1$ (step S19).

When the first determination value $\Delta Grj1$ is included in the normal range (step S19: YES), the processing section 52 determines that the EGR valve 27 is normal (step S20), and then moves to the process in step S11 again. In contrast, if the first determination value $\Delta Grj1$ is not included in the normal range (step S19: NO), the processing section 52 determines whether the first determination value $\Delta Grj1$ is less than the lower limit value $\Delta Grmin$ (step S21). When the first determination value $\Delta Grj1$ is less than the lower limit value $\Delta Grmin$ (step S21: YES), the processing section 52 determines that the EGR valve 27 has an anomaly (low flow) (step S22). When the first determination value $\Delta Grj1$ is greater than the lower limit value $\Delta Grmin$ (step S21: NO), the processing section 52 determines that the first determination value $\Delta Grj1$ is greater than the upper limit value $\Delta Grmax$ and determines that the EGR valve 27 has an anomaly (high flow) (step S23). The processing section 52, which determined the anomaly, lights the alarm lamp 54 (step S24) and ends a series of processes.

As shown in FIG. 4, when the EGR valve 27 is not in the steady state (step S17: NO), the processing section 52 determines whether the EGR valve 27 is in the rapid change state based on the derivative value $\Delta\theta rc$ of the EGR valve 27 (step S25). When the EGR valve 27 is not in the rapid change state (step S25: NO), the processing section 52 moves to the process in step S11.

When the EGR valve 27 is in the rapid change state (step S25: YES), the processing section 52 determines whether the second determination period has passed from the start of the rapid change state, i.e., whether the duration period of the rapid change state exceeds the second determination period (step S26). When the second determination period has not passed (step S26: NO), the processing section 52 moves to the process in step S11. When the second determination period has passed (step S26: YES), the processing section 52 compares the normal value ΔGrnor with the second determination value ΔGrj2, which is the integrated value of the divergence ΔGr for the second determination period (step S27).

When the second determination value ΔGrj2 is equal to or less than the normal value ΔGrnor (step S27: YES), the processing section 52 determines that the EGR valve 27 is normal (step S28) and then moves to the process in step S11 again. When the second determination value ΔGrj2 is greater than the normal value ΔGrnor (step S27: NO), the processing section 52 determines that the EGR valve 27 has an anomaly (responsiveness) (step S29). The processing section 52, which determined the anomaly, lights the alarm lamp 54 (step S30) and ends a series of processes.

Operation of the above-illustrated anomaly determination unit 50 will now be described.

In the anomaly determination unit 50, the estimated amount EGr is a value that is computed based on the opening degree instruction value θrc for the EGR valve 27. In other words, the estimated amount EGr is the EGR amount when it is assumed that the opening degree of the EGR valve 27 coincides with the opening degree instruction value θrc. The divergence between the estimated amount EGr and the actual EGR amount Gr occurs when the EGR amount corresponding to the opening degree instruction value θrc set according to the operation state at that moment differs from the actual EGR amount Gr. For example, when the actual opening area Ar is smaller than the opening degree instruction value θrc, the estimated amount EGr has a value greater than the EGR amount Gr. When the actual opening area Ar is greater than the opening degree instruction value θrc, the estimated amount EGr has a value smaller than the EGR amount Gr. In this way, it is possible for the anomaly determination unit 50 to continuously monitor the EGR amount Gr relative to the opening degree instruction value θrc.

The anomaly determination unit 50 according to the embodiment provides the following advantages.

(1) Since it is possible to continuously monitor the EGR amount Gr relative to the opening degree instruction value θrc, it is possible to determine the presence or absence of an anomaly in the EGR valve 27 even in an operation state in which the opening degree of the EGR valve 27 is limited.

(2) When the EGR valve 27 is in the rapid change state, it is possible to determine the presence or absence of an anomaly with respect to the responsiveness of the EGR valve 27. Thus, the presence or absence of an anomaly of responsiveness is determinable not only when the operation state of the engine 10 is in the no-load state, but also when the operation state of the engine 10 is in another state, e.g., an transient state. As a result, the frequency to determine the presence or absence of an anomaly for the responsiveness is increased.

(3) When the EGR valve 27 is in the steady state, it is possible to determine the presence or absence of an anomaly that has continuity such as high flow, in which a state with an excessively high EGR amount relative to the opening degree instruction value θrc continues, and low flow, in which a state with an excessively low EGR amount relative to the opening degree instruction value θrc continues.

(4) The sensor that detects the EGR pressure Pr requires an extremely high heat resistance temperature. Such pressure sensors for high temperature are extremely expensive. A case in which it is difficult to install such a sensor in a vehicle is not uncommon considering the cost aspect. In this regard, the anomaly determination unit 50 acquires the EGR pressure Pr through computation without using a pressure sensor for high temperature. Thus, the cost of acquiring the EGR pressure Pr is reduced.

(5) The exhaust pressure Pem is computed by substituting the intake air amount Ga, the working gas pressure Pwg, and the nozzle opening degree θtc into the experimental equation of equation (1). Such a configuration allows the exhaust pressure Pem to be acquired without using a pressure sensor for high temperature. As a result, the cost of acquiring the exhaust pressure Pem is reduced. (6) Since the exhaust pressure Pem is acquired by substituting individual variables into the experimental equation, the load to the processing section 52 is reduced in computation of the exhaust pressure Pem.

(7) The processing section 52 computes the absolute value of the integrated value for the second determination period as the second determination value ΔGrj2. This increases reliability on the determination result with respect to the responsiveness of the EGR valve 27.

(8) The processing section 52 computes the integrated value for the first determination period as the first determination value ΔGrj1. This increases reliability on the determination result with respect to an anomaly that has continuity such as high flow and low flow.

The above-illustrated embodiment may be modified in the following forms.

Even when the turbocharger is a fixed geometry turbocharger without the variable nozzle 28 or when the engine does not have a turbocharger, it is possible to compute the exhaust pressure Pem using the experimental equation by setting 0 to the nozzle opening degree θtc.

The exhaust pressure Pem may be computed based on the inflow amount to the turbine 22 (the intake air amount Qa, the intake air amount Ga+fuel injection amount Gf), the expansion ratio in the turbine 22, the exhaust pressure loss, which is the pressure loss of exhaust gas downstream of the turbine 22, and the atmospheric pressure. In such a configuration, the memory section 53 stores an exhaust pressure loss map in which exhaust pressure loss is defined in accordance with inflow amount.

At least one of the EGR pressure Pr and the exhaust pressure Pem may be the detection value of a pressure sensor for high temperature. Even with such a configuration, determination based on the divergence ΔGr is possible.

The EGR amount Gr is not limited to a value computed based on various types of detection values. For example, the EGR amount Gr may be a measured value of a flow rate sensor that measures the EGR amount Gr. In other words, the EGR amount acquisition section may acquire the EGR amount Gr based on the measured value of the flow rate sensor.

Even when the opening degree instruction value θrc is not in the steady state or the rapid change state, the presence or absence of an anomaly in the EGR valve 27 may be determined.

The first determination value ΔGrj1 is not limited to the integrated value of the divergence ΔGr for the first determination period. The first determination value ΔGrj1 may be the divergence ΔGr at the timing when the state is switched to the steady state or the divergence ΔGr at the timing when the steady state has continued for a predetermined period.

The second determination value ΔGrj2 is not limited to the integrated value of the divergence ΔGr for the second determination period. The second determination value ΔGrj2 may be the divergence ΔGr at the timing when the state is switched to the rapid change state or the divergence ΔGr at the timing when the rapid change state has continued for a predetermined period.

When the operation state of the engine 10 is the no-load state, the anomaly determination unit 50 may open or close the EGR valve 27 to determine the presence or absence of an anomaly with respect to the responsiveness of the EGR valve 27 based on the EGR amount Gr and the estimated amount EGr.

The EGR valve control device 40 and the anomaly determination unit 50 may be configured as one control device.

The invention claimed is:

1. An anomaly determination unit comprising:
   an EGR amount acquisition section configured to acquire an actual amount of an EGR amount, which is a flow rate of EGR gas;
   an estimation amount computation section configured to compute an estimated amount of the EGR amount based on a working gas pressure, which is a pressure of working gas in which the EGR gas and intake air are mixed, an EGR temperature, which is a temperature of the EGR gas immediately upstream of an EGR valve, an EGR pressure, which is a pressure of the EGR gas immediately upstream of the EGR valve, and an opening degree instruction value for the EGR valve; and
   a determination section configured to determine presence or absence of an anomaly in the EGR valve based on divergence between the actual amount of the EGR amount and the estimated amount.

2. The anomaly determination unit according to claim 1, wherein the determination section is configured to determine presence or absence of an anomaly with respect to responsiveness of the EGR valve on the condition that a change in the opening degree instruction value is in a range in which it is determined that an opening degree of the EGR valve has been rapidly changed.

3. The anomaly determination unit according to claim 1, wherein the determination section is configured to determine presence or absence of a continuous anomaly in the EGR valve for the opening degree instruction value on the condition that a change in the opening degree instruction value is in a range in which it is determined that an opening degree of the EGR valve is constant.

4. The anomaly determination unit according to claim 1, further comprising:
   an exhaust pressure computation section configured to compute an exhaust pressure, which is a pressure within an exhaust manifold;
   a working gas amount computation section configured to compute a working gas amount, which is a flow rate of the working gas, based on a computational equation that includes, as variables, the working gas pressure, a working gas temperature, which is a temperature of the working gas, and an engine speed;
   a pressure loss computation section configured to compute a pressure loss of the EGR gas upstream of the EGR valve based on the EGR amount; and
   an EGR pressure computation section configured to compute the EGR pressure by subtracting the pressure loss from the exhaust pressure, wherein
   the EGR amount acquisition section is an EGR amount computation section configured to compute the actual amount of the EGR amount by subtracting an intake air amount, which is an air amount received by the engine, from the working gas amount, and
   the estimation amount computation section is configured to compute the estimated amount using the EGR pressure computed by the EGR pressure computation section.

5. The anomaly determination unit according to claim 4, wherein the exhaust pressure computation section is configured to compute the exhaust pressure based on an experimental equation that includes, as variables, a nozzle opening degree, which is an opening degree of a variable nozzle included in a variable nozzle turbocharger, the intake air amount, and the working gas pressure.

* * * * *